D. CONLAN.
Shade for Billiard Tables.
No. 1,549. Reissued Oct. 6, 1863.
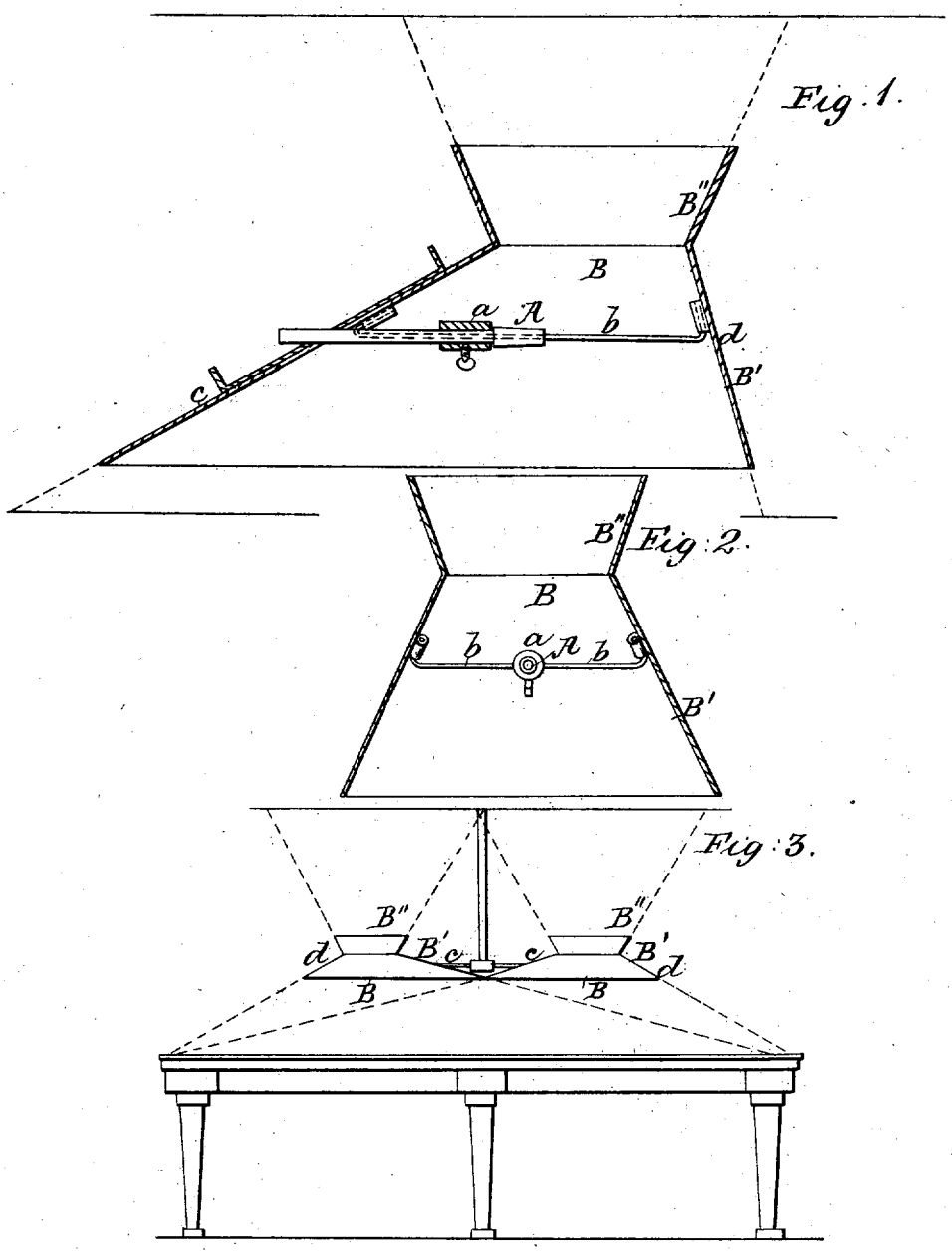
Witnesses;
Wm Tusch
R. S. Spencer
Inventor
David Conlan
N. PETERS. Photo-Lithographer, Washington, D. C.

UNITED STATES PATENT OFFICE.

DAVID CONLAN, OF NEW YORK, N. Y.

IMPROVED SHADE FOR BILLIARD-TABLES.

Specification forming part of Letters Patent No. 24,285, dated June 7, 1859; Reissue No. 1,549, dated October 6, 1863.

*To all whom it may concern:*

Be it known that I, DAVID CONLAN, of the city, county, and State of New York, have invented a new and Improved Shade for Billiard-Tables; and I do hereby declare that the following is a full, clear, and exact description of the same, reference being had to the accompanying drawings, forming part of this specification, in which—

Figure 1 represents a longitudinal vertical section of my invention. Fig. 2 is a tranverse vertical section of the same. Fig. 3 is a diagram showing its application to a billiard-table.

Similar letters of reference indicate corresponding parts in the several figures.

The object of this invention is to adapt the shades used over the lights of billiard-tables to their particular position at points which are situated at a certain distance from a vertical line drawn through the center of the table, and to arrange said shades in such a manner that all the rays from the lights are concentrated upon the table, the space beyond being left in comparative darkness.

To enable others skilled in the art to make and use my invention, I will proceed to describe it.

A represents a gas-burner, or any other source of light which serves to illuminate a billiard-table, and secured to this burner by means of a sleeve, *a*, and supported by the arms *b*, is the shade B, which is made of tinned sheet-iron or other sheet metal, or of any other suitable material, and which consists of two distinct parts, B′ B″. The lower part, B′, serves to confine the light on the table, and the upper part, B″, serves to spread the rays over a certain portion of the ceiling, from which they are reflected upon the table, but not beyond the same. In order to obtain this object, the sides of the shades have to be inclined at different angles, as will be readily understood by referring to Fig. 3. The gas-burners or lights used for the illumination of a billiard-table are usually situated in a plane drawn vertically through the longitudinal center of the table; but they are at a certain distance from the vertical plane drawn through the transverse center of said table, or each burner is considerably nearer to one of the narrow sides or ends of the table than to the other.

In order to diffuse the rays of light from each burner equally upon the whole surface of the table, the side *c* of the shade which faces the end of the table farthest from the light over which said shade is placed is arranged at a different angle from that of the side *d*, facing the end of the table nearest to the light, as will be clearly understood by referring to Fig. 1, whereas, by referring to Fig. 2, it will be noticed that the two other sides of the shade, which face the long sides of the table, are arranged at equal angles, or, in other words, the angles of the sides of the shade are made from the edges of the table, and they do not depend only upon the size of the table, but also upon the height of the shade above the table, and consequently they have to vary according to circumstances.

The inclination of the four sides which constitute the upper part of the shade is equal, or nearly so, to each other, and these sides diverge toward the ceiling, so that the rays of light are allowed to spread and made to illuminate that portion of the ceiling situated over the table, the rest being left in darkness. The light reflected from the ceiling on the table assists in illuminating the surface of said table. By my reflector each point on the same is equally illuminated throughout, as will be readily understood by referring to Fig. 3, where the rays of light are indicated in red outlines. Said rays diffuse over the whole table, and they do not interfere with each other, and by the aid of my shades I am enabled to illuminate a billiard-table with two flames quite even and perfect and more uniform than it can be done with four flames when ordinary shades are used. If more than two flames are to be used, however, I can readily accommodate the shade of each flame to its peculiar position by determining the inclination of its sides from the edges of the table.

What I claim as new, and desire to secure by Letters Patent, is—

1. A shade for billiard-tables, having two reflecting parts, B′ B″, and otherwise made as herein shown and described.

2. Determining the inclination of the sides of reflector B′ from the edges of the table, substantially as and for the purpose set forth.

DAVID CONLAN.

Witnesses:

M. M. LIVINGSTON,

JOHN W. JACKSON, Jr.